US009832254B2

(12) United States Patent
Heine et al.

(10) Patent No.: US 9,832,254 B2
(45) Date of Patent: Nov. 28, 2017

(54) RECEIVER NETWORK COMPONENT FOR OPERATION IN A COMMUNICATION NETWORK, COMMUNICATION NETWORK AND METHOD FOR OPERATING A COMMUNICATION NETWORK

(71) Applicant: SIEMENS AKTIENGESELLSCHAFT, Munich (DE)

(72) Inventors: Holger Heine, Nuremberg (DE); Clemens Hoga, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 307 days.

(21) Appl. No.: 14/668,140

(22) Filed: Mar. 25, 2015

(65) Prior Publication Data

US 2015/0281335 A1    Oct. 1, 2015

(30) Foreign Application Priority Data

Mar. 25, 2014  (EP) .................................... 14161422

(51) Int. Cl.
*H04L 29/08*    (2006.01)
*H04L 12/24*    (2006.01)
(Continued)

(52) U.S. Cl.
CPC .......... *H04L 67/10* (2013.01); *G05B 19/4185* (2013.01); *H04L 12/40176* (2013.01);
(Continued)

(58) Field of Classification Search
None
See application file for complete search history.

(56) References Cited

U.S. PATENT DOCUMENTS 6,282,669 B1    8/2001  Imanaka et al.
8,582,424 B2 *  11/2013  Kirrmann ............. H04L 12/437
                                                                 370/222
(Continued)

FOREIGN PATENT DOCUMENTS

CN    101057483 A    10/2007
CN    101989943 A    3/2011
(Continued)

OTHER PUBLICATIONS

Rentschler, et al: "The Parallel Redundancy Protocol for Industrial IP Networks", Industrial Technology (ICIT), 2013 IEEE International Conference, Feb. 25, 2013, pp. 1404-1409, XP032377292.
(Continued)

*Primary Examiner* — Patrice Winder
(74) *Attorney, Agent, or Firm* — Laurence Greenberg; Werner Stemer; Ralph Locher

(57) ABSTRACT

A receiver network component operates in a communication network of an automation system. The component receives data messages sent redundantly by transmitter network components of the communication network and rejects duplicates of an already received data message. Interoperability of network components from different manufacturers is ensured even for device-redundant transmitter network components and redundant transmission of data messages is achieve with comparatively low complexity. The receiver network component is prompted by reception of a current data message from one of the transmitter network devices to check whether a data message with identical useful data has already been received from another transmitter network component. The data message is processed if it is received for the first time and it is rejected as a duplicate if it is a data message with such useful data that have already been (Continued)

received in an earlier data message from another transmitter network component.

15 Claims, 3 Drawing Sheets

(51) Int. Cl.
  *G05B 19/418* (2006.01)
  *H04L 12/26* (2006.01)
  *H04L 12/40* (2006.01)
  *G05B 9/03* (2006.01)
(52) U.S. Cl.
  CPC ............... *H04L 43/10* (2013.01); *G05B 9/03* (2013.01); *Y02P 90/18* (2015.11)

(56) References Cited

U.S. PATENT DOCUMENTS

| | | | | |
|---|---|---|---|---|
| 8,582,426 | B2* | 11/2013 | Kirrmann | H04L 1/22 370/225 |
| 9,106,595 | B2* | 8/2015 | Kirrmann | H04L 47/10 |
| 9,379,985 | B2* | 6/2016 | Rhee | H04L 47/13 |
| 9,503,361 | B2* | 11/2016 | Finn | H04L 45/28 |
| 2007/0223533 | A1* | 9/2007 | Kirrmann | H04L 1/22 370/469 |
| 2007/0288673 | A1* | 12/2007 | Kawaguchi | G05B 19/054 710/110 |
| 2011/0029687 | A1* | 2/2011 | Kirrmann | H04L 12/437 709/236 |
| 2011/0116508 | A1 | 5/2011 | Kirrmann | |
| 2011/0206055 | A1* | 8/2011 | Leong | H04L 49/00 370/401 |
| 2013/0215771 | A1 | 8/2013 | Obrist et al. | |
| 2014/0025833 | A1* | 1/2014 | Kiessling | H04L 45/28 709/228 |

FOREIGN PATENT DOCUMENTS

| | | | | |
|---|---|---|---|---|
| CN | 102106121 | A | 6/2011 | |
| CN | 102763370 | A | 10/2012 | |
| CN | 103581164 | A | 2/2014 | |
| EP | 0854610 | A2 | 7/1998 | |
| EP | 2148473 | A1 | 1/2010 | |
| EP | 2362577 | A1 | 8/2011 | |
| JP | 2002198982 | A * | 7/2002 | H04L 12/44 |
| WO | EP 1 657 888 | A1 * | 5/2006 | H04L 1/22 |

OTHER PUBLICATIONS

Kirrmann: "Highly Available Automation Networks Standard Redundancy Methods, Rationales Behind the IEC Standard Suite", 2012, pp. 1-51, XP002728679.

Siemens AG International Standard: Industrial Communication Networks—High Availability Automation Networks, Part 3: Parallel Redundancy Protocol (PRP) and High-Availability Seamless Redundancy (HSR), Edition 2.0 Jul. 2012, Oct. 4, 2012, pp. 1-182, Switzerland.

Chinese Patent Application No. 2015101339309, search report and written opinion, pp. 1-26.

* cited by examiner

RECEIVER NETWORK COMPONENT FOR OPERATION IN A COMMUNICATION NETWORK, COMMUNICATION NETWORK AND METHOD FOR OPERATING A COMMUNICATION NETWORK

CROSS-REFERENCE TO RELATED APPLICATION

This application claims the priority, under 35 U.S.C. §119, of European patent application EP 14161422.2, filed Mar. 25, 2014; the prior application is herewith incorporated by reference in its entirety.

BACKGROUND OF THE INVENTION

Field of the Invention

The invention relates to a receiver network component for operation in a communication network of an automation system, wherein the receiver network component is set up to receive data messages sent redundantly by transmitter network components of the communication network and to reject duplicates of an already received data message. The invention furthermore relates to a communication network of an automation system having a plurality of network components that are connected to one another for the purpose of interchanging data messages, wherein data messages are interchanged redundantly, and also to a method for operating such a communication network.

Network components, that is to say networkable devices that can be connected to a communication network and that use the communication network to interchange data by transmitting appropriate data messages, are today used in many areas of technology, e.g. for the automation of installations. In the text that follows, both networkable terminals and such devices as are used for controlling and managing the transmission of data messages in the communication network, that is to say so-called switches, bridges, hubs and routers, for example, are regarded as network components. In addition, the text below uses terms such as "receiver network component" and "transmitter network component," which are likewise network components within the above meaning. The addenda "receiver" and "transmitter" are not intended to be regarded as restrictive in the present case and merely describe the respective function for the present communication phase (sending or receiving) in the current context. In this case, it is also entirely possible for a receiver network component to act as a transmitter during another communication phase, and vice versa.

Many installations operated in automated fashion require a high level of fail safety. This demand has powerful effects on the communication network that connects the network components of such an installation to one another. Therefore, such communication networks are usually of redundant design. A preferred approach in this context involves ensuring that reliable transmission of data messages between the individual network components is ensured even if a communication link within the communication network fails. In this context, the term "communication link" covers the entire transmission link between the respective network components, that is to say both an existent (wired or wireless) transmission medium and the physical, communication-oriented and logical connection thereof to the respective network component (e.g. interfaces, communication devices, protocol stacks).

An example of the use of such a communication network that needs to be of failsafe design is an automation installation in which network components in the form of networkable automation devices are connected to one another via the communication network for the purpose of interchanging data messages. Automation installations are used for automating systems, e.g. electrical power supply systems or electrical switching installations, and usually comprise automation devices (e.g. so-called field devices) that are arranged in proximity to primary components of the relevant installation, that is to say the electrical power supply system, for example. In the case of an electrical power supply system, primary components of this kind may be electrical cables and lines, transformers, generators, motors or converters, for example. The automation devices may be meters, so-called electrical protective devices or bay controllers, which are installed in substations for electrical power supply systems. In the technical lingo, such automation devices are often also referred to as so-called IEDs (intelligent electronic devices). In this case, the automation devices are connected to the communication network and use the latter to interchange data messages that comprise control commands, reports about events (e.g. threshold value infringements), measured values or status reports, for example, as useful data.

One option for making a communication network failsafe in respect of its communication links and in so doing ensuring largely seamless further operation of the automation installation even in the event of a fault in a communication link is described in IEC standard 62439-3:2012 as what is known as the parallel redundancy protocol (PRP). In this case, seamless redundancy is achieved by virtue of the communication network having two mutually independent subnetworks of arbitrary topology and each network component being connected to both subnetworks. Both subnetworks operate in parallel mode, and for the purpose of sending a data message a transmitter network component sends said data message firstly to the first subnetwork and secondly to the second subnetwork. The receiver network component envisaged as the recipient of the data message receives both data messages from the subnetworks, using the first data message arriving at it and rejecting as a duplicate the data message that arrives later. Since the two data messages use two mutually independent transmission paths in this context, even if there is a fault present on one of the transmission paths there is the assurance that the other—usually still intact—transmission path will route the useful information item transmitted with the data message to the receiver network component. The use of a communication network designed on the basis of the PRP standard is known from the introductory part of the description of the European patent application EP 2148473 A1 and its counterpart patent No. U.S. Pat. No. 8,582,424 B2, for example.

As an alternative solution for a PRP communication network, the above-mentioned EP 2148473 A1 and U.S. Pat. No. 8,582,424 B2 propose using a communication network based on the standard for high-availability, seamless redundancy (HSR), which is likewise described in IEC 62439 3:2012. An HSR communication network is designed to have a ring topology, each network component being incorporated into the ring with two communication ports. A transmitter network component transmits a data message in both directions of the ring; the receiver network component receives the first data message to arrive and rejects the second as a duplicate. On account of the closed ring structure, there are always two mutually independent communication paths between all network components, so that even in the event of a fault in one of the two communication paths transmission of the data message is ensured via the respective other transmission path.

PRP and HSR are used as redundancy concepts in ever more automation installations and are therefore preferred forms of communication networks for achieving redundancy for the communication links. In future, it can be assumed that the use of both embodiments will become even more established.

In some automation installations, redundancy that relates to the pure transmission path of the data messages is not enough, however. For installations for high voltage direct current transmission (HVDC), for example redundancy is thus often also demanded for transmitter network components themselves (device-redundant transmitter network components) that transmit data messages that are important for operation of the installations. Such data messages contain useful data that relate to the actuation of converters for the installations, for example. In other automation installations too, there may also be demands in respect of redundancy at the level of the transmitter network components. To date, proprietary communication and redundancy methods are used for communication networks having redundant transmitter network components, as a result of which there is frequently no interoperability of network components from different manufacturers. Furthermore, the proprietary redundancy methods are often implemented at the level of the application, as a result of which the methods can be carried out only with a comparatively high level of computation complexity.

SUMMARY OF THE INVENTION

It is accordingly an object of the invention to provide a receiver network component of the type in question, a communication network of the type in question and a method for operating such a communication network which overcome the above-mentioned and other disadvantages of the heretofore-known devices and methods of this general type and according to which it is possible firstly to ensure interoperability of network components from different manufacturers, even for device-redundant transmitter network components, and secondly to achieve redundant transmission of data messages with comparatively low complexity.

With the foregoing and other objects in view there is provided, in accordance with the invention, a receiver network component for operation in a communication network of an automation system, the receiver network component comprising:

a device for receiving data messages sent redundantly from transmitter network components of the communication network and configured to reject duplicates of a data message already received by the receiver network component;

the receiver network component being configured to be prompted by a reception of a current data message from one of the transmitter network devices to check the data message as to whether a data message with identical useful data has already been received from another transmitter network component; and the receiver network component being configured to process a data message with a useful data content received for the first time further, and to reject as a duplicate a data message with such useful data as have already been received in an earlier data message from the other transmitter network component.

In other words, the above object is achieved by a receiver network component of the type cited at the outset, wherein the receiver network component is set up to be prompted by reception of a current data message from one of the transmitter network devices to check said data message for whether a data message with identical useful data has already been received from another transmitter network component, and to process a data message with a useful data content received for the first time further, and to reject as a duplicate a data message with such useful data as have already been received in an earlier data message from another transmitter network component.

The receiver network component according to the invention allows simple processing of redundant data messages that have been sent to the receiver network component by more than one transmitter network component. Since identification and elimination of duplicates of redundantly sent data messages takes place for the receiver network component according to the invention in a generally similar manner to that in the known PRP or HSR methods, there is additionally also assurance for the interoperability of devices from different manufacturers that already support the PRP or HSR standard and merely need to be strengthened, in line with the receiver network component according to the invention, to process data messages sent redundantly by a plurality of transmitter network components too.

In this context, a data message that arrives at the receiver network component and that has been produced largely at the same time as a data message already having arrived at the receiver network component previously and contains identical useful data to the data message that arrived previously is regarded as a duplicate data message. In this case, the format in which the useful data are transmitted in the data messages can be chosen to be the same or different, only the identity of the content being important.

According to one advantageous embodiment, the receiver network component is set up to perform the check on the currently received data message using a sender identifier contained in the data message.

Such a sender identifier explicitly indicates that transmitter network component that has sent the respective data message. By way of example, a MAC address (MAC—Media Access Control) of the respective transmitter network component can be used as a sender identifier. In this embodiment, the receiver network component does not need to perform an explicit content check on the received data messages, but rather resorts to the sender identifier contained in the received data message in order to identify duplicates.

In this connection, it is also regarded as advantageous if the receiver network component comprises a group information item about such transmitter network components as send identical, in terms of their useful data content, data messages to the receiver network component while they are operating, and is set up to perform the check on the currently received data message using the sender identifier of the currently received data message and the sender identifiers of the transmitter network components indicated in the group information item.

In this embodiment, the group information item is a file or a portion of a file, for example, in which related transmitter network components are indicated. Transmitter network components are regarded as related if they send data messages that are identical in terms of their useful data content while they are operating. On the basis of the sender identifiers of the transmitter network components indicated in the group information item, the receiver network component can identify a duplicate arriving from a transmitter network component: this is because a data message with identical content has already been received previously from one of the further transmitter network components indicated in the group information item.

In this connection, it is additionally regarded as advantageous if the group information item contains sender identifiers of transmitter network components such that a sender identifier of all those transmitter network components that send data messages with identical useful data content to the receiver network component while they are operating is selected as a group sender identifier and the sender identifiers of all other associated transmitter network components are allocated to the group sender identifier.

This describes a particularly simply constructed type of group information item. This is because said group information item already contains the relevant sender identifiers of all transmitter network components that send identical, in terms of their useful data content, data messages to the receiver network component while they are operating. Such transmitter network components are subsequently also referred to as a group. One of the sender identifiers is selected as what is known as a "group sender identifier" and from then on is used to characterize the group. When using a group information item of such design, it is sufficient for the purpose of identifying duplicates if the receiver network component equates all sender identifiers contained in the group information item to the group sender identifier of the respective group. The check on the currently received data message then involves firstly translation of the sender identifier contained in the currently received data message into the group sender identifier and secondly comparison of whether a data message that is identical in terms of its useful data content and has this sender identifier has already arrived previously. In this case, that transmitter network component whose sender identifier is used as a group sender identifier naturally retains its sender identifier for the check. The group information item may in this case be in the form of a table or a text file with ORing of all sender identifiers of the related transmitter network components, for example.

A further advantageous embodiment of the network component according to the invention additionally provides for the receiver network component to be set up to perform the check on the currently received data message using a sequence number contained in the data message.

In this case, sequence number denotes an explicit—at least within a predefined time range—number of the data message, from which it is usually also possible to infer an order for the data messages. A data message that is sent later therefore contains a higher sequence number than a data message that is sent earlier. So that the data range, from the data message, that is used for the sequence number does not need to be chosen too high, there is usually a time range predefined (e.g. 1 second or 2.5 seconds) within which the sequence numbers are explicit. When the time range has expired, the sequence number allocation starts over again. The receiver network component may then be set up to use the sequence number to identify duplicates. In this case, the sequence number can be used as an alternative or in addition to the use of other criteria, such as a sender identifier. If sequence numbers are used for identifying duplicates, it is possible, by way of example, for the transmitter network components to be coordinated with one another in respect of their sending of data messages such that data messages with identical content are allocated identical sequence numbers by the different transmitter network components. By way of example, this can be achieved by means of time synchronization of the transmitter network components (for example using a 1 pps time pulse based on GPS or the time synchronization protocol IEEE 1588). Another option is for the receiver network component to permit a certain "fuzziness" for the sequence numbers and to identify as duplicates even such data messages as admittedly do not have exactly matching sequence numbers but which sequence numbers are sufficiently close together.

According to a further advantageous embodiment, the receiver network component is also configured, upon receiving a current data message, to check whether a data message with identical useful data has already been received from the same transmitter network component, and to process a data message with a useful data content received for the first time further and to reject as a duplicate a data message with such useful data as have already been received in an earlier data message from the same transmitter network component.

According to this embodiment, the receiver network component is strengthened to be operated in PRP or HSR communication networks, which comprise firstly classic transmitter network components (one transmitter network component transmits redundant data messages) and secondly device-redundant transmitter network components (two transmitter network components transmit redundant data messages). In this way, a relatively slight adjustment to the redundancy algorithms allows device-redundant transmitter network components to be incorporated into existing PRP or HSR communication networks.

With the above and other objects in view there is also provided, in accordance with the invention, a communication network of the type cited in the outset in which the communication network comprises at least two transmitter network components that send identical, in terms of their useful data content, data messages to at least one receiver network component while they are operating, the at least one receiver network component is set up to be prompted by reception of a current data message from one of the transmitter network devices to check said data message for whether a data message with identical useful data has already been received from another transmitter network component, and to process a data message with a useful data content received for the first time further, and to reject as a duplicate a data message with such useful data as have already been received in an earlier data message from another transmitter network component.

All comments made above and below in respect of the receiver network component according to the invention apply to the communication network according to the invention, and vice versa, in corresponding fashion; in particular, the receiver network component according to the invention in any desired embodiment or a combination of any embodiments can be operated in the communication network according to the invention. Reference is also made to the advantages described for the receiver network component according to the invention in respect of the advantages of the communication network according to the invention.

According to one advantageous embodiment of the communication network according to the invention, the transmitter network components are set up to add sender identifiers to the data messages sent by them; the at least one receiver network component is additionally set up to perform the check on the currently received data message using the sender identifier.

In this connection, it is regarded as advantageous if the at least one receiver network component comprises a group information item about such transmitter network components as send identical, in terms of their useful data content, data messages to the receiver network component while they are operating, and if the receiver network component is set up to perform the check on the currently received data message using its sender identifier and the sender identifiers of the transmitter network components indicated in the group information item.

In order to be able to send to a receiver network component an information item about related transmitter network components in a particularly simple manner, it is proposed according to a further advantageous embodiment of the communication network according to the invention that at least one of the transmitter network components is set up to send to the at least one receiver network component a network configuration message that contains firstly a dedicated sender identifier and secondly sender identifiers of all such transmitter network components as send identical, in terms of their useful data content, data messages, like the at least one transmitter network component, to the at least one receiver network component while they are operating.

In this embodiment, the at least one receiver network component therefore first of all collects information about all transmitter network components associated with it, i.e. sending redundant data messages with it during operation, and then sends this information to the at least one receiver network component. For PRP or HSR communication networks, the configuration message used can be the supervision frame, for example, which is provided in the standard anyway and which is extended by an additional TLV field (TLV—type length value) in which the other transmitter network components associated with the at least one transmitter network component are indicated.

A further advantageous embodiment of the communication network according to the invention has provision for the transmitter network components to be set up to allocate to the data messages sent by them sequence numbers that are time-synchronized to one another, and for the at least one receiver network component to be set up to perform the check on the currently received data message using the sequence number.

Furthermore, it is regarded as an advantageous embodiment of the communication network according to the invention if the communication network also comprises such transmitter network components as themselves send data messages with identical useful data to the at least one receiver network component, wherein these data messages are sent to the at least one receiver network component via different communication paths of the communication network, and if the at least one receiver network component is also set up to be prompted by reception of a current data message to check whether a data message with identical useful data has already been received from the same transmitter network component, and to process a data message with a useful data content received for the first time further, and to reject as a duplicate a data message with such useful data as have already been received in an earlier data message from the same transmitter network component.

Finally, the aforementioned object is also achieved by a method for operating a communication network of an automation system having a plurality of network components that are connected to one another for the purpose of interchanging data messages, wherein the data messages are interchanged redundantly.

The invention provides that at least two transmitter network components send identical, in terms of their useful data content, data messages to at least one receiver network component while they are operating, the at least one receiver network component is prompted by reception of a current data message from one of the transmitter network devices to check said data message for whether a data message with identical useful data has already been received from another transmitter network component, and processes a data message with a useful data content received for the first time further and rejects as a duplicate a data message with such useful data as have already been received in an earlier data message from another transmitter network component.

All comments made above and below in respect of the receiver network component according to the invention and the communication network according to the invention apply to the method according to the invention, and vice versa, in corresponding fashion; in particular, the receiver network component according to the invention and the communication network according to the invention are set up to carry out the method according to the invention in any desired embodiment or a combination of any embodiments. Reference is also made to the advantages described for the receiver network component according to the invention or for the communication network according to the invention in respect of the advantages of the method according to the invention.

In respect of the method according to the invention, one advantageous embodiment may have provision for the transmitter network components to add a sender identifier to each of the data messages sent by them, and for the at least one receiver network component to perform the check on the currently received data message using the sender identifier.

A further advantageous embodiment of the method according to the invention additionally provides for the transmitter network components to allocate to the data messages sent by them sequence numbers that are time-synchronized to one another, and for the at least one receiver network component to perform the check on the currently received data message using the sequence number.

Other features which are considered as characteristic for the invention are set forth in the appended claims.

Although the invention is illustrated and described herein as embodied in a receiver network component for operation in a communication network, communication network and method for operating a communication network, it is nevertheless not intended to be limited to the details shown, since various modifications and structural changes may be made therein without departing from the spirit of the invention and within the scope and range of equivalents of the claims. Specifically, it should be understood that individual refinement features of the exemplary embodiment can be freely combined with one another and with the features described above in any desired manner The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

DETAILED DESCRIPTION OF THE INVENTION

Figure 1:
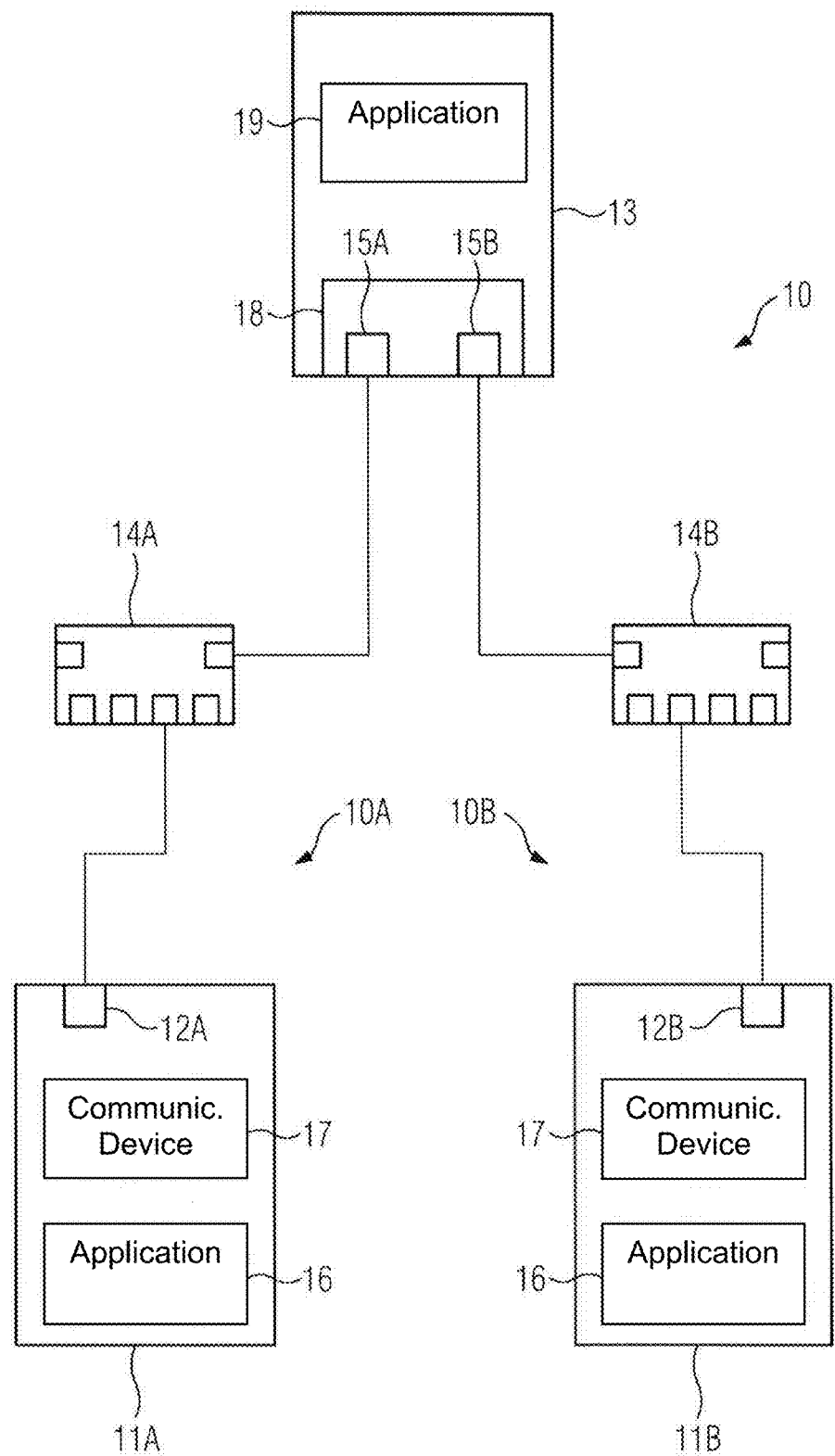
FIG. 1 shows a schematic illustration of a communication network of simple design with two device-redundant transmitter network components and a receiver network component.

Referring now to the figures of the drawing in detail and first, particularly, to FIG. 1 thereof, there is shown a highly schematic illustration of an exemplary embodiment of a communication network 10 of very simple design. According to the exemplary embodiment shown, the communication network 10 consists of two subnetworks 10A and 10B that can be used by two transmitter network components 11A, 11B to transmit data messages redundantly to a receiver network component 13. To this end, the subnetworks 10A and 10B are of redundant design with respect to one another and, besides communication lines, also have switches 14A and 14B. The switches 14A and 14B are used for correctly forwarding the data messages from the transmitter network components 11A, 11B to the receiver network component 13. Besides the design shown for the communication network 10, it is naturally also possible to use other network topologies, for example the communication network 10 may have a ring-shaped design and/or there may be a plurality of transmitter and receiver network components in place.

The transmitter network components 11A, 11B are in device-redundant form, i.e. they generate data messages having identical useful data content while they are operating and sending said data messages to the receiver network component 13. In the exemplary embodiment shown in FIG. 1, each of the two transmitter network components 11A, 11B has exactly one port, that is to say one network interface, via which it is connected to one of the subnetworks 10A or 10B. Specifically, the transmitter network component 11A has its port 12A connected to the switch 14A of the one subnetwork 10A, while the transmitter network component 11B has its port 12B connected to the switch 14B of the second subnetwork 10B. In another embodiment, which is not shown in FIG. 1, each of the transmitter network components 11A, 11B can also have two respective ports via which it is connected to both subnetworks. Furthermore, as a departure from the illustration in FIG. 1, there may also be more than two device-redundant transmitter network components provided.

The two device-redundant transmitter network components 11A, 11B execute identical or at least sufficiently similar functions while they are operating, e.g. they pick up measured values via sensors, not shown in more detail, or record particular events in a process, not shown in more detail. In this connection, the transmitter network components 11A, 11B may be meters, remote terminal units or merging units in an automation system (e.g., for automating power supply systems or an HVDC transmission installation). For this purpose, the transmission network components 11A, 11B execute appropriate applications 16, which may be embodied in the form of a piece of device software or a special piece of device hardware or a combination of the two, for example. The results of the execution of the respective application 16 may be envisaged for being sent to the receiver network component 13 in this case. A prerequisite for this is that the transmitter network components 11A, 11B generate identical results (e.g., identical measured values) as a result of the execution of identical or at least sufficiently similar functions.

The application 16 of each transmitter network component 11A, 11B transfers the results to a communication device 17 of the respective transmitter network component 11A, 11B. The respective communication device 17 uses the results to produce data messages, the results being provided as useful data for the data messages. Each of the two transmitter network components 11A, 11B then sends data messages with identical useful data content, wherein the transmitter network component 11A sends a data message to the receiver network component 13 via the subnetwork 10A and the transmitter network component 11B sends a data message to the receiver network component 13 via the subnetwork 10B, so that ultimately two data messages with identical useful data content are sent to the receiver network component 13. Whereas the useful data content of the data messages needs to be identical in order to transmit actually redundant information, it is entirely permissible for there to be differences in respect of the data format.

On receiving each data message, the receiver network component 13 checks whether an identical, in terms of useful data, data message from another transmitter network component has already been received. To this end, the receiver network component 13 has two ports 15A, 15B that connects it to the two subnetworks 10A and 10B. In an alternative embodiment—not shown in FIG. 1—the receiver network component may also have just one port that is set up in suitable fashion to receive data messages from both subnetworks. Furthermore, the receiver network component 13 has a duplicate filter 18 that is used to perform the check on the data messages. In this case, the duplicate filter 18 may be in the form of a hardware-programmed circuit chip (e.g. ASCI, FPGA) or in the form of a software module of a piece of device software or in the form of a combination of hardware and software, for example.

If the result of the check on a currently received data message by the duplicate filter 18 is that an identical, in terms of its useful data, data message from another transmitter network component has not yet been received, the currently received data message or the useful data content thereof is forwarded to an application 19 running on the receiver network component 13, e.g. a piece of control, analysis or monitoring software, for processing. If, on the other hand, the result of the check is that a data message having identical useful data has already been received, then the currently received data message is rejected as a duplicate by the duplicate filter 18 and accordingly not forwarded to the application 19, in order to prevent the multiple processing of the same useful data.

In this context, the duplicate filter 18 needs to be designed to identify duplicates of such data messages as have been sent by different transmitter network components 11A, 11B.

In the simplest case, the duplicate filter can analyze the content of the useful data of the respective data messages in order to identify duplicates. This approach requires no further information, but is comparatively complex and therefore also requires a relatively large amount of time to perform it. It is therefore appropriate to resort to other criteria for identifying duplicates.

As one possible criterion for identifying duplicates, it is possible for the duplicate filter to use sender identifiers, for example, which the transmitter network components 11A, 11B append to the respective data messages. In this case, the sender identifier indicates the respective transmitter network component distinctively. By way of example, an MAC address of the respective transmitter network component can be used as a sender identifier. In this case, the duplicate filter needs to know which transmitter network components are actually in device-redundant form, i.e. from which transmitter network components it can expect data messages with identical content in terms of the useful data. To this end, the receiver network component may comprise a group information item, for example, that indicates such device-redundant transmitter network components.

This can involve such a group information item indicating the respective transmitter network component on the basis of a serial or device number, on the basis of a geographical location or on the basis of another designation that is characteristic of the respective transmitter network component, for example. In this case, the duplicate filter would need to ascertain the sender identifiers of the transmitter network components indicated in the group information in this manner and use them for duplicate identification. However, it is regarded as particularly advantageous if the group information item indicates the respective associated transmitter network components on the basis of their respective sender identifier straight away. For practical handling purposes, the group information item can select the sender identifier of one of the related device-redundant transmitter network components as a group sender identifier, for example, and allocate the sender identifiers of the other transmitter network components in this group to this group sender identifier. This can be accomplished in the form of a table, for example. An example of such a table in which the two transmitter network components 11A and 11B in FIG. 1 are entered as related device-redundant transmitter network components is shown in Table 1 below.

TABLE 1

| Group sender identifier | Individual sender identifier |
|---|---|
| MAC address transmitter NC 11A | MAC address transmitter NC 11A |
| MAC address transmitter NC 11A | MAC address transmitter NC 11B |

As can be seen from Table 1, the sender identifier of the transmitter network component 11A (shortened to "transmitter NC" in Table 1) has been selected as a group sender identifier. The individual sender identifiers of the two transmitter network components 11A and 11B are each associated with the group sender identifier. By way of example, the sender identifiers used are the respective MAC addresses of the transmitter network components 11A and 11B.

When checking for duplicates, the duplicate filter 18 checks a currently received data message by taking the sender identifier (which is usually entered as part of what is known as the message header) therefrom and using the group information item to allocate the associated group sender identifier to the individual sender identifier taken. From that point on, the group sender identifier is used for the further check instead of the individual sender identifier. If the duplicate filter identifies that a data message having the same group sender identifier has already been received beforehand, the currently received data message is rejected as a duplicate. When a data message having this group sender identifier is received for the first time, it is processed further, on the other hand, and its content is forwarded to the application 19, for example.

Instead of a table form as indicated in Table 1, the group information item may also be in any other form, for example in the form of a text file or in the form of a table with other formatting. What is important in this case is merely that logic ORing is set up between all individual sender identifiers of the related transmitter network components. By way of example, this can also be accomplished by merely stringing together the respective sender identifiers in logic ORed fashion, without selecting a group sender identifier.

So that, after a data message with a particular group sender identifier is received for the first time, all further data messages having the same sender identifier are not rejected as duplicates without limitation, the duplicate filter may be set up to start a timer after a data message is received for the first time and to reject as duplicates only such data messages having an identical group sender identifier as are received within a prescribed time range following reception of the first data message, for example. If the timer indicates that the prescribed time range has expired, a further data message having the same group sender identifier is accepted as a first data message again and the timer is restarted. In this case, the time range can be stipulated as a parameter by an operator of the network components, for example, and chosen on the basis of the frequency of the data messages sent, the usual interval of time between two successive data messages and the transmission time of the communication network and also the variance in this transmission time.

By way of example, the group information item can be produced by the operator of the communication network manually and stored in the receiver network component. Alternatively, however, provision may also be made for the information item about the related transmitter network components to be transmitted to the receiver network component by the transmitter network components themselves. To this end, at least one transmitter network component in a group of transmitter network components that are of device-redundant design with respect to one another sends a network configuration message to the receiver network component. Said network configuration message contains a statement about all those transmitter network components that form a group of device-redundant transmitter network components together with the transmitter network component sending the network configuration message. By way of example, the statement contained in the network configuration message may contain the sender identifiers of all other transmitter network component associated with the respective group. The network configuration message can be sent to the receiver network component by a selected transmitter network component in the group or by all transmitter network components in the group. The receiver network component can use the at least one received network configuration message to produce the group information item. By way of example, the network configuration message used may be a "supervision frame"—which needs to be sent for the PRP or HSR standard anyway—that has been extended by the necessary content.

As another criterion, it is alternatively or additionally possible for a sequence number contained in the respective data message also to be used for considering the sender identifier. The sequence number used by the respective transmitter network component may be consecutive numbering of the data messages in accordance with the order in which they are sent, for example. A data message having a relatively high sequence number has accordingly been sent later than a data message having a relatively low sequence number. So as not to allow data messages sent in increasing number to exceed the data range used for the sequence number in the data message, the maximum length of the sequence number is usually stipulated in advance. By way of example, the range reserved for the sequence number in a PRP or HSR compliant data message has a length of two bytes, which therefore allows a sequence number range of 0 . . . 65525. By way of example, a maximum sequence number length of 50 000 (numerical range 0 . . . 49999) can be prescribed by the operator in the transmitter network components. When data messages are sent at intervals of 20 µs, the sequence number is repeated every second in this case, and if data messages are sent only over 50 µs, for example, then the sequence number is repeated only after 2.5 s. This accordingly requires the duplicate filter 18 to store the sequence number range and the time range until the sequence number is repeated (or alternatively the transmission frequency of the data messages).

When the criterion of the sequence number is used, the transmitter network components need to be designed to send data messages having an identical sequence number preferably simultaneously. To this end, the device-redundant transmitter network components can be synchronized to one another by means of established time synchronization methods (e.g. use of the 1 pps pulse from the GPS signal or synchronization based on IEEE 1588), so that they transmit data messages having an identical useful data content in time sync with the same sequence number. Alternatively, however, it is also possible for the duplicate filter 18 to have a "fuzziness range" stipulated in it, within which the sequence numbers of the data messages must lie so as still to be identified as duplicates. By way of example, this allows the value of the sequence number of the data message received first +/−10 to be accepted as an identical sequence number value.

When checking for duplicates on the basis of the sequence number, the duplicate filter 18 checks a currently received data message by taking the sequence number (which is usually entered as part of the message header) therefrom and checking whether a data message having the same (or almost the same) sequence number has already been received from another transmitter network component. If this is the case, the currently received data message is rejected as a duplicate. When a data message having this sequence number is received for the first time, on the other hand, it is processed further and its content is forwarded to the application 19, for example.

The combination of both criteria described is regarded as particularly advantageous for identifying duplicates. In this case, on receiving a current data message, the duplicate filter firstly uses the sender identifier to check whether a data message has already been received from one of the device-redundant transmitter network components 11A, 11B, and secondly uses the sequence number to check whether a data message having the same (or almost the same) sequence number has already been received. If the check turns out positive in both cases, a data message having the same useful data content for one of the device-redundant transmitter network components and having a (sufficiently) matching sequence number has already been received, as a result of which the currently received data message is rejected as a duplicate. Otherwise, it is accepted as a data message arriving for the first time and processed further. The use of both criteria for identifying duplicates is particularly suitable even when the device-redundant transmitter network components are meant to be operated in a conventional PRP or HSR communication network, these networks also comprising such transmitter network components as are not in device-redundant form. The reason is that duplicate identification, as described at the outset, for such data messages as are transmitted to the receiver network component by the same transmitter network component via different communication paths takes place in such communication networks on the basis of the sender identifier of said one transmitter network component and the sequence number. For the purpose of operating a "mixed" PRP or HSR communication network, it is therefore merely necessary for the duplicate filter to be strengthened to be able to perform not only identification of duplicates that come from the same transmitter network component but also identification of duplicates that have been sent by different transmitter network components. This "mixed" operation is explained briefly below with reference to FIGS. 2 and 3.

Figure 2:
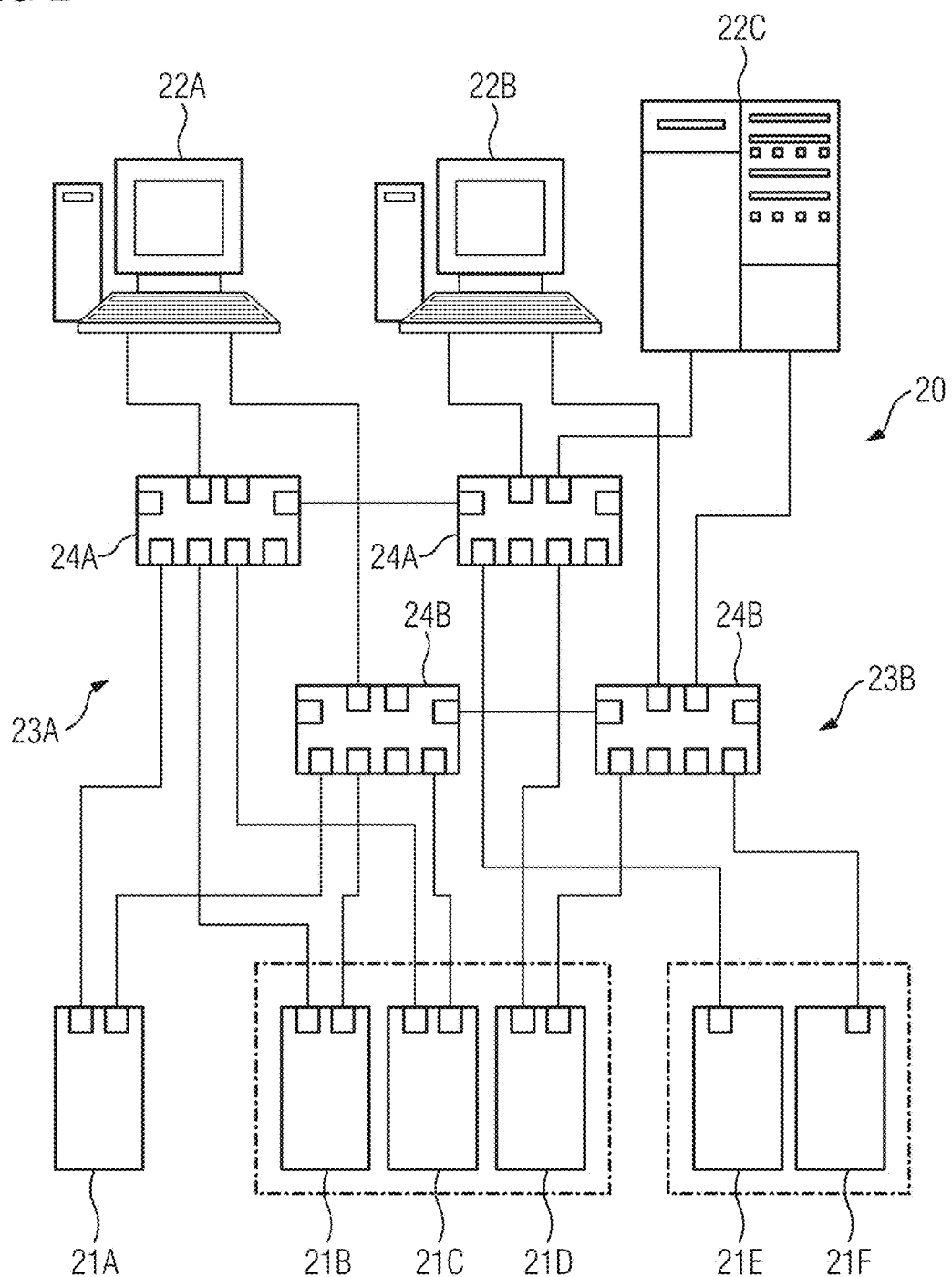
FIG. 2 shows an exemplary schematic illustration of a PRP communication network with device-redundant transmitter network components.

FIG. 2 shows an example of the design of a mixed communication network 20 that is designed on the basis of IEC standard 62439-3:2012 (PRP). The communication network 20 is used for redundant connection of transmitter network components 21A-21F to receiver network components 22A-22C. In this case, the transmitter network components 21A-F, while they are operating, send data messages to one, more or all of the receiver network components 22A-C.

In order to ensure redundant and interference-immune transmission of the data messages between the network components 21A-F, the communication network 20 has two mutually independent subnetworks 23A and 23B that are operated in parallel. The two subnetworks 23A and 23B match in terms of the communication protocol they use on the MAC-LLC level (MAC=media access control; LLC=logical link control), but may differ entirely in terms of their performance and their topology. There is no direct connection between the two subnetworks 23A and 23B, which means that data messages from the first subnetwork 23A cannot reach the other subnetwork 23B, and vice versa. The subnetworks 23A and 23B have switches that are set up to correctly forward the data messages; specifically the subnetwork 23A comprises switches 24A while the subnetwork 23B comprises switches 24B.

The transmitter network component 21A has no other device-redundant transmitter network components and is set up to send data messages to at least one of the receiver network components 22A-C on the basis of the PRP standard. To this end, it has two ports, and is connected to each of the subnetworks 23A, 23B via a respective port. While it is operating, the transmitter network component 21A sends data messages having an identical useful data content to the at least one receiver network component 22A-C using identical sender identifiers and sequence numbers. The respective receiver network component has a duplicate filter that identifies a duplicate of an already received data message on the basis of the matching sender identifier and the matching sequence number and therefore rejects said duplicate.

The transmitter network components 21B-D are in device-redundant form with respect to one another. The transmitter network components 21B-D, like the transmitter network component 21A, are each connected to the subnetwork 23A via one port and are each connected to the subnetwork 23B via another port. While they are operating, the transmitter network components 21B-D send data messages having an identical useful data content to the at least one receiver network component 22A-C using respective individual sender identifiers and identical sequence numbers. The communication network 20 therefore simultaneously always contains six redundant data messages from the transmitter network components 21B-D, five of which need to be filtered out as duplicates. Two respective instances of the six data messages have identical sender identifiers in this case.

For the purpose of allocating the identical sequence numbers, the transmitter network components 21B-D are time-synchronized to one another. The relationship between the transmitter network components 21B-D is stored in the respective receiver network component in the form of a group information item as described above. The group sender identifier selected by way of example is the sender identifier of the transmitter network component 21B. The corresponding group information item may be in a form as shown in Table 2, for example.

TABLE 2

| Group sender identifier | Individual sender identifier |
|---|---|
| MAC address transmitter NC 21B | MAC address transmitter NC 21B |
| MAC address transmitter NC 21B | MAC address transmitter NC 21C |
| MAC address transmitter NC 21B | MAC address transmitter NC 21D |

The duplicate filter of the respective receiver network component 22A-C identifies a duplicate of an already received data message on the basis of the matching group sender identifier and the matching sequence number and rejects it accordingly.

The transmitter network components 21E-F are likewise in device-redundant form with respect to one another. However, the transmitter network components 21E-F each have only one port. In order to ensure redundant transmission of the data messages, the transmitter network component 21E is connected to the subnetwork 23A via its port and the transmitter network component 21F is connected to the subnetwork 23B via its port. While they are operating, the transmitter network components 21E-F send data messages having an identical useful data content to the at least one receiver network component 22A-C using respective individual sender identifiers and identical sequence numbers. The communication network 20 therefore simultaneously always contains two redundant data messages from the transmitter network components 21E-F, one of which is to be filtered out as a duplicate. In this case, the data messages have different sender identifiers.

For the purpose of allocating the identical sequence numbers, the transmitter network components 21E-F are time-synchronized to one another. The relationship between the transmitter network components 21E-F is stored in the respective receiver network component in the form of a group information item as described above. The group sender identifier selected by way of example is the sender identifier of the transmitter network component 21E. The corresponding group information item may be in a form as shown in Table 3, for example.

TABLE 3

| Group sender identifier | Individual sender identifier |
|---|---|
| MAC address transmitter NC 21E | MAC address transmitter NC 21E |
| MAC address transmitter NC 21E | MAC address transmitter NC 21F |

The duplicate filter of the respective receiver network component 22A-C identifies a duplicate of an already received data message on the basis of the matching group sender identifier and the matching sequence number and rejects it.

In order to ensure smooth operation both of the individual transmitter network component 21A and of the device-redundant transmitter network components 21B-F, the individual transmitter network component 21A may also have a group information item available for it in which said transmitter network component is entered as a single group member, with its sender identifier matching the group sender identifier. The duplicate filter can then perform the check for duplicates solely on the basis of the respective group information item.

The group information item may be available for every single group of transmission network components separately, as explained by way of example with reference to FIG. 2. Alternatively, however, a single group information item can also be formed that comprises an information item about all existent transmitter network components 21A-F in the communication network 20. Such a group information item may be in a form as shown in Table 4, for example.

TABLE 4

| Group sender identifier | Individual sender identifier |
|---|---|
| MAC address transmitter NC 21A | MAC address transmitter NC 21A |
| MAC address transmitter NC 21B | MAC address transmitter NC 21B |
| MAC address transmitter NC 21B | MAC address transmitter NC 21C |
| MAC address transmitter NC 21B | MAC address transmitter NC 21D |
| MAC address transmitter NC 21E | MAC address transmitter NC 21E |
| MAC address transmitter NC 21E | MAC address transmitter NC 21F |

Figure 3:
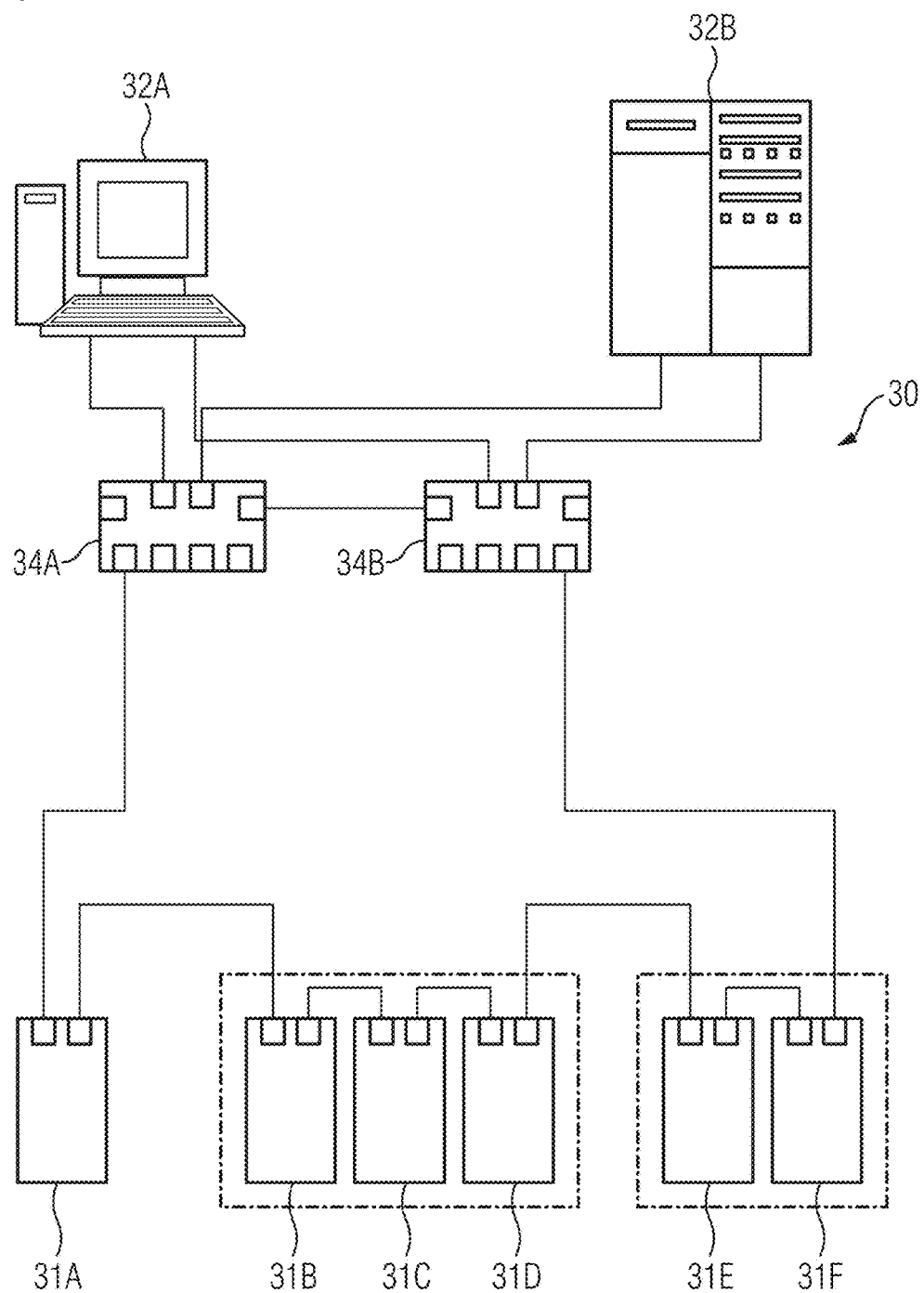
FIG. 3 shows an exemplary schematic illustration of an HSR communication network with device-redundant transmitter network components.

Finally, FIG. 3 shows, by way of example, the design of a mixed communication network 30, which is in the form of a ring-shaped communication network on the basis of IEC standard 62439-3:2012 (HSR). The communication network 30 is used for the redundant connection of transmitter network components 31A-31F to receiver network components 32A-B. While they are operating, the transmitter network components 31A-F send data messages to one, more or all of the receiver network components 32A-B in this case.

In order to ensure redundant and interference-immune transmission of the data messages between the network components 31A-F, the communication network 30 has two mutually independent network paths on account of its ring structure, namely, as seen from the respective transmitter network component 31A-F, one transmission path in the clockwise direction and one transmission path in the anti-clockwise direction. The transmitter network components 31A-F each have two ports, one of the ports being connected to the port of its neighbor device in each case. For the purpose of connecting the receiver network components 32A-B to the communication network 30, switches 34A-B are provided. A network component that receives a data message that is not directed to it forwards said data message—maintaining the general direction of transmission—directly to its respective other port.

The transmitter network component 31A has no other device-redundant transmitter network component and is set up to send data messages to at least one of the receiver network components 32A-B on the basis of the HSR standard. While it is operating, the transmitter network component 31A sends data messages having an identical useful data content to the at least one receiver network component 32A-B via both ports in different directions of transmission using identical sender identifiers and sequence numbers. The respective receiver network component has a duplicate filter that identifies a duplicate of an already received data message on the basis of the matching sender identifier and the matching sequence number and therefore rejects it.

The transmitter network components 31B-D are in device-redundant form with respect to one another. While they are operating, the transmitter network components 31B-D send data messages having an identical useful data content to the at least one receiver network component 32A-B via both ports in different directions of transmission using respective individual sender identifiers and identical sequence numbers. The communication network 30 therefore simultaneously always contains six redundant data messages from the transmitter network components 31B-D, five of which need to be filtered out as duplicates. Two respective instances of the six data messages have identical sender identifiers in this case.

For the purpose of allocating the identical sequence numbers, the transmitter network components 31B-D are time-synchronized to one another. The relationship between the transmitter network components 31B-D is stored in the respective receiver network component in the form of a group information item as described above. The duplicate filter of the respective receiver network component 32A-B identifies a duplicate of an already received data message on the basis of the matching group sender identifier and the matching sequence number and rejects it accordingly.

The transmitter network components 31E-F are likewise in device-redundant form with respect to one another. While they are operating, the transmitter network components 31E-F send data messages having an identical useful data content to the at least one receiver network component 32A-B via both ports in different directions of transmission using respective individual sender identifiers and identical sequence numbers. The communication network 30 therefore simultaneously always contains four redundant data messages from the transmitter network components 31E-F, three of which need to be filtered out as duplicates. Two respective instances of the four data messages have identical sender identifiers in this case.

For the purpose of allocating the identical sequence numbers, the transmitter network components 31E-F are time-synchronized to one another. The relationship between the transmitter network components 31E-F is stored in the respective receiver network component in the form of a group information item as described above. The duplicate filter of the respective receiver network component 32A-B identifies a duplicate of an already received data message on the basis of the matching group sender identifier and the matching sequence number and rejects it.

In summary, the invention therefore describes a way in which even redundant data messages that have been sent to a receiver network component by different transmitter network components, but ones that are in device-redundant form with respect to one another, can be filtered for duplicates. To this end, criteria (sender identifier, group sender identifier, sequence number) have been presented that can be taken as a basis for identification of such data messages as having identical useful data content to take place. It is regarded as particularly advantageous that the invention provides a way of integrating even transmitter network components in device-redundant form into existing PRP or HSR communication networks without considerable intervention. This merely requires a group information item to be stored within the duplicate filters and the evaluation of the currently received data messages to be performed on the basis of their respective group sender identifier taken from the group information item.

The invention claimed is:

1. A receiver network component for operation in a communication network of an automation system, the receiver network component comprising:
a device for receiving data messages sent redundantly from at least two different device-redundant transmitter network components of the communication network, each of the at least two different transmitter network components including at least one communication port and configured to reject duplicates of a data message already received by the receiver network component;
the receiver network component being configured to be prompted by a reception of a current data message from one of the transmitter network devices to check the currently received data message as to whether another data message with identical useful data has already been received from another transmitter network component; and
the receiver network component being configured to process the currently received data message when the currently received data message has a useful data content that is received for the first time, and to reject the currently received data message as a duplicate data message when the useful data content in the currently received data message has already been received in the other data message from the other transmitter network component.

2. The receiver network component according to claim 1, wherein the receiver network component is configured to perform the check on the currently received data message using a sender identifier contained in the currently received data message.

3. The receiver network component according to claim 2, wherein:
the receiver network component comprises a group information item about such transmitter network components that send identical, in terms of a useful data content thereof, data messages to the receiver network component while they are operating; and
the receiver network component is configured to perform the check on the currently received data message using the sender identifier of the currently received data message and the sender identifiers of the transmitter network components indicated in the group information item.

4. The receiver network component according to claim 3, wherein the group information item contains sender identifiers of transmitter network components such that a sender identifier of all those transmitter network components that send data messages with identical useful data content to the receiver network component while they are operating is selected as a group sender identifier and the sender identifiers of all other associated transmitter network components are associated with the group sender identifier.

5. The receiver network component according to claim 1, wherein the receiver network component is configured to perform the check on the currently received data message using a sequence number contained in the currently received data message.

6. The receiver network component according to claim 1, wherein:
the receiver network component is also configured to be prompted by the reception of the currently received data message to check whether another data message with identical useful data has already been received from the same transmitter network component, and to process the currently received data message when the currently received data message has a useful data content that is received for the first time and to reject the currently received data message as a duplicate when the currently received data message has useful data that has already been received in the other data message from the same transmitter network component.

7. A communication network of an automation system having a plurality of network components connected to one another for interchanging data messages with redundant data message interchange, the communication network comprising:
- at least one receiver network component;
- at least two different transmitter network components, each of the at least two different transmitter network components including at least one communication port and configured, in operation, to send identical, in terms of a useful data content thereof, data messages to said at least one receiver network component;
- said at least one receiver network component being configured, upon receiving a current data message from one of said transmitter network devices:
  - to check the current data message for whether a data message with identical useful data has already been received from another said transmitter network component; and
  - to process a data message with a useful data content received for the first time further; or
  - to reject as a duplicate a data message with such useful data as have already been received in an earlier data message from another said transmitter network component.

8. The communication network according to claim 7, wherein:
- said transmitter network components are configured to add sender identifiers to the data messages sent by them; and
- said at least one receiver network component is configured to perform the check on the currently received data message using the sender identifier.

9. The communication network according to claim 8, wherein:
- said at least one receiver network component contains a group information item about such transmitter network components as send identical, in terms of a useful data content thereof, data messages to said at least one receiver network component while they are operating; and
- said at least one receiver network component is configured to perform the check on the currently received data message using a sender identifier thereof and the sender identifiers of said transmitter network components indicated in the group information item.

10. The communication network according to claim 7, wherein at least one of said transmitter network components is configured to send to said at least one receiver network component a network configuration message that contains a dedicated sender identifier and sender identifiers of all such transmitter network components as send during operation identical, in terms of a useful data content thereof, data messages, like the at least one transmitter network component, to the at least one receiver network component.

11. The communication network according to claim 7, wherein said transmitter network components are configured to allocate to the data messages sent by them sequence numbers that are time-synchronized to one another; and the at least one receiver network component is configured to perform the check on the currently received data message using the sequence number.

12. The communication network according to claim 7, which comprises such transmitter network components as themselves send data messages with identical useful data to the at least one receiver network component, wherein the data messages are sent to the at least one receiver network component via different communication paths of the communication network; and
- wherein the at least one receiver network component is also configured, upon receiving a current data message, to check whether a data message with identical useful data has already been received from the same transmitter network component, and:
  - to further process a data message with a useful data content received for the first time; or
  - to reject as a duplicate a data message with such useful data as have already been received in an earlier data message from the same transmitter network component.

13. A method of operating a communication network of an automation system having a plurality of network components that are connected to one another for interchanging data messages, the method comprises:
- interchanging the data messages redundantly;
- sending, from at least two different transmitter network components, identical data messages having identical useful data content, to at least one receiver network component while the transmitter networks are operating, wherein each of the at least two different transmitter network components includes at least one communication port;
- prompting the at least one receiver network component, by reception of a current data message from one of the transmitter network devices, to check the currently received data message for whether another data message with identical useful data has already been received from another transmitter network component; and
- when the currently received data message has a useful data content that is received for the first time, further processing the currently received data message; and
- when the useful data content of the currently received data message has already been received in the other data message from the other transmitter network component, rejecting as a duplicate the currently received data message with the useful data as already having been received.

14. The method according to claim 13, which comprises:
- adding with the transmitter network components a sender identifier to each of the data messages sent by them; and
- performing the check with the at least one receiver network component on the currently received data message using the sender identifier.

15. The method according to claim 13, which comprises:
- with the transmitter network components, allocating to the data messages sent by them sequence numbers that are time-synchronized to one another; and
- performing the at least one receiver network component the check on the currently received data message using the sequence number.

* * * * *